May 20, 1924.
O. W. LUMRY ET AL
LAWN WEEDER
Filed Dec. 27, 1923
1,494,557
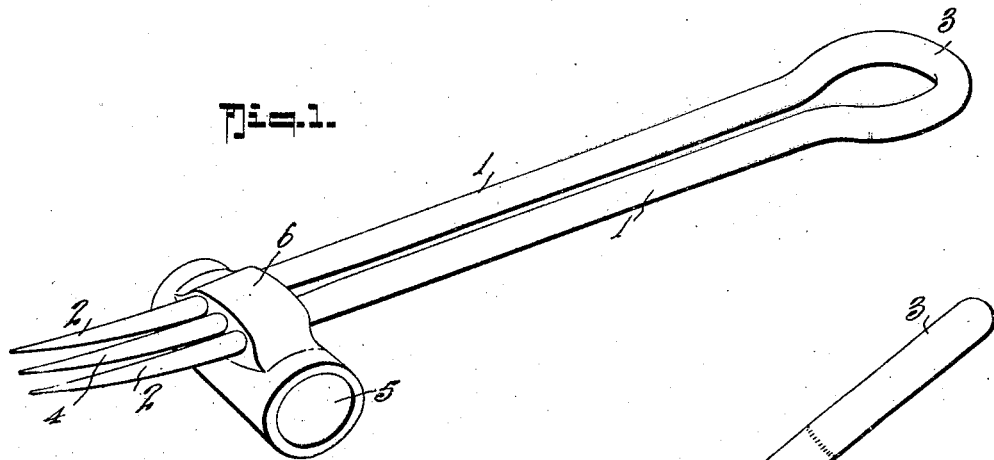
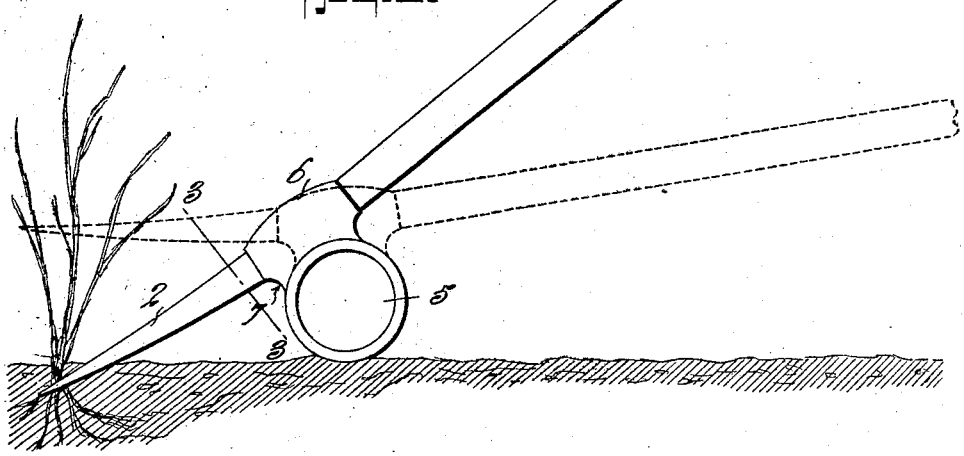
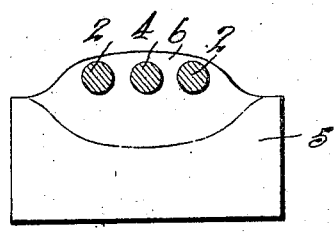
INVENTOR
Orris W. Lumry.
William O. Lumry.
BY
ATTORNEY

UNITED STATES PATENT OFFICE.

ORRIS WILLIAM LUMRY AND WILLIAM ORRIS LUMRY, OF RENO, NEVADA.

LAWN WEEDER.

Application filed December 27, 1923. Serial No. 682,953.

*To all whom it may concern:*

Be it known that we, ORRIS WILLIAM LUMRY and WILLIAM ORRIS LUMRY, citizens of the United States, both residing at Reno, in the county of Washoe and State of Nevada, have invented certain new and useful Improvements in Lawn Weeders, of which the following is a specification.

Our invention has for its object to provide a simple, inexpensive tool, particularly adapted for weeding lawns without leaving unsightly holes where the weeds are pulled, and without indenting the sod around the place where the weed is pulled.

In its general nature, our invention comprises a weeding tool made up of only three parts securely united by welding, brazing or other like means into a rigid structure; a weeding tool which may be made at a mere nominal cost.

In its more detail nature, the invention resides in those novel features of construction, combination and arrangement of parts, all of which will be first fully described, then be specifically pointed out in the appended claims, and illustrated in the accompanying drawings, in which:

Figure 1 is a perspective view of the invention.

Figure 2 is a side elevation of the same showing the weeder introduced into position to engage the roots of a weed, in full lines, and showing the position of the weeder in dotted lines, after the handle has been pressed down to lift the weed.

Figure 3 is a cross section on the line 3—3 on Figure 2.

In the drawings, in which like numerals indicate like parts in all of the figures, 1 is a piece of rod iron or steel bent back upon itself with a loop 3 and sharpened at its ends as at 2 to form a pair of tines, between which a third tine 4 is located. The tines 2 and 4 are rigidly united by metal 6 welded, brazed or otherwise integrally incorporated with the base portion of the tines and with the cylindrical roller section 5, which may consist of a short piece of pipe, the uniting material 6 being smoothed and curved at 7 and being of a somewhat longer extent than the diameter of the pipe 5 to form a strong securing means for the single tine 4 and hold it in proper relative position with relation to the tines 2—2.

In the use of the invention, which invention is especially adapted and designed for weeding lawns, the points of the fork are inserted into the ground close to the base of the weed to grip the root, as indicated in Figure 1, and pressure is then forced downwardly on the handle of the tool, which causes a rolling motion to take place between the pipe or cylindrical section 5 and the ground, thereby changing the place of pressure constantly while the weed is being lifted and preventing the fulcrum being forced into the ground to dent the sod while at the same time giving sufficient leverage to pull the weed straight up out of the ground without leaving a large hole.

We are aware that prior to this invention weeding tools have been provided and we do not therefore broadly claim such a tool but what is claimed is:

1. A weed puller comprising a fork composed of a single rod looped upon itself and having its ends tapered and brought in proximity whereby to constitute a handle and tines, a short third tine located between the tapered end tines of the rod, a cylindrical-section fulcrum member located transversely beneath said tines at a substantial distance from the pointed ends thereof, and means embedding said tines and uniting them rigidly to said cylindrical-section fulcrum.

2. A weed puller comprising a fork composed of a single rod looped upon itself and having its ends tapered and brought in proximity whereby to constitute a handle and tines, a short third tine located between the tapered end tines of the rod, a cylindrical-section fulcrum member located transversely beneath said tines at a substantial distance from the pointed ends thereof, means embedding said tines and uniting them rigidly to said cylindrical-section fulcrum, said embedding and uniting means being a greater length than the diameter of said cylindrical-section fulcrum to brace the short tine and rigidly secure it in place between the other tines.

ORRIS WILLIAM LUMRY.
WILLIAM ORRIS LUMRY.